2,987,447
HAND CONDITIONERS

John B. Ward, Parsippany, N.J., assignor to Louis H. Jon, Inc., Newark, N.J., a corporation of New Jersey
No Drawing. Filed Jan. 6, 1959, Ser. No. 785,111
4 Claims. (Cl. 167—92)

This invention relates to novel compositions of matter. In one of its more specific aspects, the invention is directed to compositions of matter finding especial use on and as conditioners for the human hands and especially the fingers which of course are parts thereof when they are to be used in various different fields, but especially in the field of sports, such as bowling, golf, baseball, tennis, etc.

In such sports, and probably most especially in the field of bowling, it is essential that the gripping fingers of the hand, which carry and throw the bowling ball, have the required or desired characteristics of both slip and grip so that the bowling ball may be properly controlled and such fingers are adequately protected from blistering and abrasion.

After extended experimentation, I have produced unique combinations of readily available materials, which combinations serve the aforesaid and other purposes. Such unique combinations are novel compositions of matter, which are preferably in powdered condition. One of the essential components of this invention is rosin, which as is well known, has good pro-friction properties. However, the application of rosin alone to the human hands is undesirable for a number of both physiological and aesthetic reasons. From the physiological viewpoint, there is the ever-present possibility of skin irritation, as well as the tendency toward producing blistering and abrasions of the gripping areas of the hands because of the "dead stop" type of gripping action imparted by the rosin. From the aesthetic point of view, the almost invariable presence of body exudations, such as perspiration, etc. on the skin coupled with the closely entrapped heat of the hand in its gripping action tends to produce tackiness; and upon repeated usage, there is a tendency to build up on the skin as well as on certain areas of the object, such as bowling ball, or the like, being gripped, heavy layers of glue-like materials in the form of unsightly patches, which afford irregular type of gripping action and consequently, must be removed from time to time.

According to this invention, the novel compositions of this invention comprise the following components, with or without other materials, such as perfume or the like, in minor amounts: rosin, kaolin, calcium carbonate and talc. Each of said components is in a finely divided condition and in a powdered form. Said four components, with or without perfume or other material, are mixed with each other or in any manner blended together to provide a substantially uniform powder whose components are in such proportions that the combinations are free flowing through a small orifice without appreciable caking and when applied to the hands, impart thereto the requisite grip and slip characteristics without buildup on either the object gripped or on the fingers. The calcium carbonate preferably employed is precipitated calcium carbonate which in such combination functions essentially as a neutral carrier or vehicle and therefore is present in an amount equal to about 100–400 parts by weight thereof for each 100 parts of the sum of the weights of rosin, kaolin and talc employed. Besides acting as a carrier or vehicle, said calcium carbonate also serves or functions to impart to my novel compositions of matter slight pro-friction propensities by virtue of its inherent faint grittiness. Such pro-friction properties imparted thereto by said calcium carbonate are different in nature than such properties imparted thereto by the rosin which may be characterized as being of the tacky or sticky type. Consequently, the presence of said calcium carbonate in such relatively high proportions tends to and does reduce the danger of "dead stop" type of gripping action and also layer buildup on the fingers and object gripped while at the same time acting together with the rosin component, imparts the requisite gripping properties of different types and which together act somewhat synergistically to provide the grip desired. The amount of rosin employed in my novel compositions of matter may vary depending upon the degree of grip desired which, of course, is dictated by the specific use thereof, whether it be for bowling, baseball, tennis, etc. In general, the amount of rosin employed is such that the ratio by weight of rosin to the sum of the weights of kaolin, talc and calcium carbonate is 1–25 and preferably 2–12.5 parts of rosin to 100 parts of the sum of the weights of said kaolin, talc and calcium carbonate. The talc and kaolin together serve to modify the pro-friction properties of the rosin and calcium carbonate, and especially the former. Their presence in the novel compositions of matter of this invention imparts thereto certain characteristics as to make such novel compositions of matter eminently suitable for the purposes intended. The talc and kaolin serve as agents to absorb body exudations, such as perspiration and the like, normally present as a result of gripping action and also to modify the grip character of the calcium carbonate, and especially the sticky action of the rosin, so that the proper degree of slip, which is indispensable, is attained and at the same time the proper degree of grip is also attained. Thus I have provided novel compositions of matter having both the necessary grip and slip characteristics. The amounts of kaolin and talc employed in my novel compositions of matter may vary over wide limits depending upon the grip and slip required. In general, the amount of kaolin is such that for each 100 parts of the sum of the weights of rosin, talc and calcium carbonate, 2–20 and preferably 7–16 parts by weight of kaolin is employed; and the amount of talc is such that for each 100 parts of the sum of the weights of rosin, kaolin and calcium carbonate, 2–20 and preferably 4–12 parts by weight of talc is employed. In one of its preferred and specific aspects, the novel compositions of this invention consists essentially by weight of: 2–12.5 parts of powdered rosin, 7–16 parts of kaolin NF, 4–12 parts of talc USP and 50–80 parts of calcium carbonate precipitated USP.

Such combinations of components in the proportions heretofore set forth provide a variety of novel compositions of matter which serve to provide powders useful in various fields where the proper grip and slip are essential.

The following are specific examples of some of the novel compositions of matter of this invention and are given by way of illustration and not limitation, all parts being given by weight unless otherwise specified:

Example 1

| | Parts |
|---|---|
| Rosin NF fine powder | 5 |
| Talc USP | 7.5 |
| Kaolin NF | 12.5 |
| Calcium carbonate precipitated USP | 75 |

Example 2

| | |
|---|---|
| Rosin NF fine powder | 2 |
| Talc USP | 20 |
| Kaolin NF | 20 |
| Calcium carbonate precipitated USP | 58 |

Example 3

| | Parts |
|---|---|
| Rosin NF fine powder | 20 |
| Talc USP | 2 |
| Kaolin NF | 2 |
| Calcium carbonate precipitated USP | 76 |

Example 4

| | |
|---|---|
| Rosin NF fine powder | 10 |
| Talc USP | 20 |
| Kaolin NF | 20 |
| Calcium carbonate precipitated USP | 50 |

Example 5

| | |
|---|---|
| Rosin NF fine powder | 2 |
| Talc USP | 10 |
| Kaolin NF | 10 |
| Calcium carbonate precipitated USP | 78 |

In order to improve the acceptability of said novel compositions of this invention, a very small amount of a scenting agent such as oil of lavender, oil of rose or synthetic perfume composition may be combined therewith.

The manufacturing procedure which may be employed for the production of my novel compositions of matter is that standard in the pharmaceutical art. With the exception of the rosin, all of the components employed in the examples have sharply defined particle size by virtue of their official monographs. The rosin is ground to a fine powder, using a hammer mill or suitable grinding equipment. If perfume is employed, it is blended with the talc in a mixer, such as a ribbon mixer. Then the rosin is added to the perfumed talc and well mixed therewith after which the kaolin is added and mixed and finally the calcium carbonate precipitated is added and mixed to provide a free flowing perfumed composition of this invention. Following each of the additions as before set forth, intensive mixing is employed and to assure proper dispersion of the components with respect to each other to provide substantially uniform composition of this invention, the entire mix is forced through a sieve. The resultant mix is a fine powder which is a pharmaceutically elegant preparation which when employed for the purposes intended, will not build up on the hands or object gripped, will not cause abrasion or blisters but will impart the requisite grip and slip.

It is to be understood that the following claims are intended to cover all the generic and specific features of the invention herein described and all statements of the scope of the invention which as a matter of language might be said to fall therebetween, and that they are intended to be inclusive in scope and not exclusive in that, if desired, other materials in minor amounts may be added to my novel compositions of matter herein claimed without departing from the spirit of the invention.

I claim:

1. A human hand conditioning composition of matter to provide at least a part of the surface of a human hand with the required degree of grip and slip comprising (a) rosin, (b) talc, (c) kaolin and (d) calcium carbonate, said components being in finely divided condition and being substantially uniformly distributed with respect to each other, with 1–25 parts by weight of (a) to each 100 parts of the sum of the weights of (b), (c) and (d), 2–20 parts by weight of (b) to each 100 parts of the sum of the weights of (a), (c) and (d), 2–20 parts by weight of (c) to each 100 parts of the sum of the weights of (a), (b) and (d) and 100–400 parts by weight of (d) to each 100 parts of the sum of the weights of (a), (b) and (c), said composition of matter being free flowing.

2. A human hand conditioning composition of matter to provide at least a part of the surface of a human hand with the required degree of grip and slip comprising 2–12.5 parts of rosin, 7–16 parts of kaolin, 4–12 parts of talc and 50–80 parts of calcium carbonate, all parts being by weight and said components being in finely divided condition and being substantially uniformly distributed with respect to each other, said composition of matter being free flowing.

3. A human hand conditioning composition of matter to provide at least a part of the surface of a human hand with the required degree of grip and slip comprising about 5 parts of rosin, 7.5 parts of talc, 12.5 parts of kaolin and 75 parts of calcium carbonate, said components being in finely divided condition and substantially uniformly distributed with respect to each other, said composition of matter being free flowing.

4. A method for conditioning at least a part of the surface of a human hand to provide said part with the desired degree of grip and slip comprising applying to said part a composition of matter comprising (a) rosin, (b) talc, (c) kaolin and (d) calcium carbonate, said components being in finely divided condition and being substantially uniformly distributed with respect to each other, with 1–25 parts by weight of (a) to each 100 parts of the sum of the weights of (b), (c) and (d), 2–20 parts by weight of (b) to each 100 parts of the sum of the weights of (a), (c) and (d), 2–20 parts by weight of (c) to each 100 parts of the sum of the weights of (a), (b) and (d) and 100–400 parts by weight of (d) to each 100 parts of the sum of the weights of (a), (b) and (c), said composition of matter being free flowing.

References Cited in the file of this patent

UNITED STATES PATENTS

| 1,214,157 | Hameister | Jan. 30, 1917 |
|---|---|---|
| 2,012,259 | Denman | Apr. 27, 1935 |

OTHER REFERENCES

Goodman: Cosmetic Dermatology, McGraw-Hill Book Co., N.Y. 1936, p. 340.